UNITED STATES PATENT OFFICE 2,466,048

PREPARATION OF CLAY CATALYSTS

Hubert A. Shabaker, Media, and George Alexander Mills, Ridley Park, Pa., and Ruth C. Denison, Wilmington, Del., assignors to Houdry Process Corporation, Wilmington, Del., a corporation of Delaware No Drawing. Application January 30, 1946, Serial No. 644,423

13 Claims. (Cl. 252—450)

The present invention relates generally to processes for the treatment of argilloferruginous substances and more particularly to the preparation of solid adsorbents useful as contact catalysts in the conversion of hydrocarbons.

It has heretofore been proposed to employ as contact masses in catalytic conversion of hydrocarbons certain natural earths and clays. Very few of such materials that have been tried in cracking, reforming or related reactions, have been found appropriate for the purpose, since in many instances catalysts formed therefrom were found to be substantially inert, or had a tendency to promote excessive deposition of coky substance which is not only undesirable on its own account, but such deposit also effects rapid decline in catalytic activity, necessitating frequent regeneration after comparatively short periods of on stream operation.

The value of a contact material as a catalyst in the processes referred to is dependent upon its capability of selectively forming from the charge stock optimum quantities of desired liquid hydrocarbons, such as products useful as motor fuel, with a minimum production of gas and coke. For instance, a contact material which is relatively inert catalytically, such as diatomaceous earth or kieselguhr, when attempted to be used in a cracking operation, yields products varying but little in quality and quantity from that obtained by thermal cracking in the absence of such contact material. On the other hand, there are contact materials of natural or synthetic origin which have the property of forming from petroleum hydrocarbon fractions large quantities of carbon and low molecular weight gases including hydrocarbon gases, at the expense of desired liquid fractions. Such contact materials likewise are not ordinarily useful or desirable as cracking or reforming catalysts.

Among the natural adsorptive materials which are either substantially inert or otherwise impractical because they produce large quantities of coke and/or gas compared to the gasoline yield, there are some clays including certain sub-bentonites, which can be activated by known methods, such as acid treatment, to produce catalysts of acceptable quality. Many available clays, however, do not respond to the usual methods of activation to produce catalysts of sufficiently high selectivity and activity level and are regarded as unsuitable for use as cracking or reforming catalysts.

Naturally occurring clays are composed chiefly of hydrosilicates of aluminum but ordinarily contain besides the principal compounds and complexes of silica and alumina lesser proportions of compounds of iron, calcium, magnesium, etc. Some clays also may include among their lesser components, compounds of zirconium or titanium. In the selection of natural adsorptive materials for use as catalysts it has previously been observed in U. S. Patent 2,078,945 of Eugene J. Houdry, that the content of iron as ferric oxide has a critical relation to the capacity of the contact mass for regeneration without extensive loss in catalytic activity. The patent indicates that contact masses suitable for use as catalysts should not contain over 3% of iron oxide.

It has now been found in accordance with the present invention that by treatment of argilloferruginous materials with hydrogen sulfide at elevated temperatures under conditions hereinafter described the iron compounds therein are converted to a form whereby the same can be readily and selectively removed without such accompanying removal of aluminum compounds or other detrimental changes which reduce or destroy the adsorptive qualities of the product or reduce its catalytic activity. The residual mass acquires as a result of the treatment surprisingly new and important properties particularly evidenced when a clay treated in accordance with the invention and prepared as a catalyst is utilized in hydrocarbon conversion, as will appear below. By the herein proposed treatment, natural clays previously regarded as not utilizable as cracking catalysts are made suitable for such use and otherwise catalytically active and acid activatable clays considerably improved in useful properties.

The new catalysts obtained by our methods are characterized by important differences in physical properties that cannot be attributed entirely to their reduced iron content and accordingly certain structural changes are believed to have taken place as a result of the described novel treatment of the clay. For instance, the new products no longer shrink materially at temperatures (1600° F.), withstand higher temperatures without substantial depreciation in catalytic activity, and demonstrate a distinguishing X-ray pattern. Besides the new catalysts generally have a characteristic difference in color being whiter or lighter than the natural clays from which they are prepared, and notable differences in spectogram are also observed. Chemical analysis indicates that the treated product has had its iron content markedly reduced in that it contains a total of iron compounds not in excess of about 0.4% Fe₂O₃ by weight on a dry basis. By more severe treatments according to the invention products having even lower iron content are obtained, as of 0.2 to 0.3% Fe₂O₃ and frequently as low as 0.1% or lower.

Catalysts prepared from clays treated in accordance with the present invention obtain not only unexpectedly low initial coke makes on heavy and sulfur stocks, but demonstrate a surprising resistance to "abnormal aging" and deterioration by highly corrosive charge stocks, on continued use. The weight ratios of gasoline/coke and gasoline/gas on lighter charge stocks may be substantially improved, and in fact, the present catalysts have in many instances demonstrated surprisingly better gasoline/gas ratios than commercial synthetic catalysts. Because of the new and improved properties of the present products as catalysts, they are capable of withstanding more severe conditions and high regeneration temperatures in practical operation. This property provides a longer "useful life" for the catalyst which considered together with the significantly improved yields of desired cracked products obtained by the use thereof, constitute important economic advantages in addition to that afforded consequent to the use of readily available and inexpensive raw materials. Moreover, it is now made possible to operate more efficiently and economically with sulfur-containing and other corrosive stocks which rapidly deteriorate ordinary clay catalysts.

The treatment of the clay in accordance with the present invention effects a transformation to acid soluble salts of that portion of its iron content present in a form not selectively removable by acid leaching, whereby it is made available for subsequent removal such as by a mild acid treatment and/or washing or in some instances by volatilization. By the treatment with hydrogen sulfide at elevated temperature, the otherwise not readily available and difficultly removable iron compounds are apparently converted to iron sulfide, which is quite soluble in acid solutions. In terms of the theory set out above, although it is not desired to be bound thereby, there is reason to believe that the iron present as a silicon complex or otherwise forming a part of the lattice structure as by addition to or proxy for other principal cations of the pattern, is converted by the high temperature H₂S treatment to simpler or more reactive compounds such as sulfides which are soluble in the acid employed in subsequent leaching. For instance, it has been observed that on treatment of a commercial acid activated montmorillonite at high temperature with H₂S gas, the obtained product on exposure to oxidizing conditions exhibits a red coloration characteristic of ferric oxide, which is not formed on oxidation of the original acid activated clay.

The gaseous treatment with hydrogen sulfide at elevated temperature may be preceded by a wet treatment with mineral acid or an organic acid which forms soluble iron salts or complexes, including lower aliphatic carboxylic acids such as oxalic and acetic as well as hydroxy acids including lactic and the so called sugar acids. Where the acid treatment precedes, the more available iron compounds (f. i., outside of the lattice structure) are removed as soluble salts as in the known acid activation of bentonites leaving the residual iron component (f. i., chemically combined in the lattice) to be reacted with the gaseous treating agent. Acid treatment following the dry gaseous treatment is effective in assisting the removal of products formed by the reaction of the gaseous agents with the complex or otherwise less available residual iron components. It will be readily understood, therefore, that it may be desirable to employ an acid treatment before as well as after the H₂S treatment at elevated temperature. Instead of removing the solubilized iron by acid or other solvent, it is possible to convert the same to vaporizable compounds such as ferric chloride and remove the same by volatilization. Of course, this step, if practiced can also be followed by a subsequent acid washing step.

In the production of a catalyst, in accordance with the preferred embodiment, from a clay of the montmorillonite group or other clay having the characteristics of the bentonites or subbentonites, the initial acid pretreatment is particularly advantageous, since the otherwise poor porosity of the clay impedes penetration by the hydrogen sulfide. Generally with kaolin type clays acid pretreatment is less significant although with some types of kaolin clays acid pretreatment will also be found beneficial. The acid treatment may be effected by known processes such as are employed in the art for "acid activation" in the manufacture of decolorizing clays. For instance, the acid treatment may be carried out on the clay in finely divided form while the clay is suspended in water as in the nature of a slurry, to which concentrated mineral acid such as hydrochloric or sulfuric is added, or dilute mineral acid may be added directly to the finely divided clay. In either case the ratio of acid to clay is preferably in the order of about 30 to 40%. The mixture of clay and acid is preferably heated to about 160° F. to 210° F. for a period of two to twelve hours, thereafter water washed and filtered. If desired, the clay may at this point be washed free of acid ions with accompanying extraction of soluble metal salts. The acid treated clay with or without purification by washing may then be dried by any known or desired manner. More concentrated or larger proportions of acid may be employed and/or higher temperatures including increased pressures, or longer periods of treatment up to the approximate limit where the combined effect tends to no longer selectively remove iron compounds without undue solution of aluminum compounds. This point cannot always be defined accurately with respect to chemical composition of the acid treated clay, for the optimum point varies with the source of the raw bentonites. For many if not most raw bentonites, however, this point is reached when the weight ratio of SiO₂ to Al₂O₃ of the total clay lies in the range of 2.5:1 to 10:1 and the residual alumina content is in the range of about 25 to 5%. Acid treatments of clay such as for instance are described in U. S. Patents 1,397,113, 1,579,326, 1,642,871 are suitable. The acid pretreatment, of course, may be less severe than is required for activation of the clay and may be sufficient only to open pores in the clay, allowing easy access of the hydrogen sulfide.

The untreated clay or the above described acid treated clay or a commercially obtainable acid treated clay in dry finely divided form, or after being formed into particulate masses as for instance by granulating, molding, extruding or the like (as is practiced in forming of clay catalysts) is subjected to the treatment with H₂S gas at a temperature in the range of from about 1200° F. up to about the temperature which would result in rapid shrinkage or substantial incipient fusion of the clay. Since clays will vary in composition and properties including fusion temperature even when obtained from the same source, exact temperature ranges cannot be set out. It has been observed that with montmorillonite types of clay the maximum temperature may be as high as 1500° and at times 1550° F., whereas in the case of kaolin clays, even higher temperatures may be employed as above 1600° to 1650° F. The quantity of gas or vapor employed should be at least sufficient to chemically combine with the quantity of iron present in the clay but is advantageously employed in excess.

The reduced iron compounds such as sulfides formed by the $H_2S$ treatment may be removed by washing the treated clay product as with a solvent therefor, or by treating with dilute acid, if desired alternated with water or solvent. The acid or solvent employed should advantageously have a selective action on the iron compounds formed by the $H_2S$ treatment without removing substantial quantities of the aluminum or silicon components of the product. Instead of leaching or wet extracting the freed iron compounds, they may be converted by further treatment with an appropriate reagent to a vaporizable compound, such as ferric chloride which is removed by vaporization. In some instances it will be found advantageous to subject the clay to intermediate oxidizing conditions following the treatment with $H_2S$, which may be accomplished by subjecting the clay to hot air at a temperature of 800–1000° F. or less. In this manner the subsequent leaching by acid or solvent will be more effective.

To obtain the beneficial advantages of the present invention it is essential that the treatment with hydrogen sulfide be carried out at temperatures in excess of about 1200° F. since at lower temperatures the tenaciously bound isomorphous iron compounds are not sufficiently released and the resulting products do not possess the described important properties of catalysts prepared in accordance with the present invention. The desired modification of the clay and transformation of the iron by the $H_2S$ can be effected in short time as of the order of several minutes, far less than an hour being required even at the lower temperatures of the described range.

Although in certain known processes of hydrocarbon conversion the catalyst can be employed in the form of finely divided particles or powders suspended in the charge stock, in other procedures, as for instance in fixed or moving bed operation, the catalyst is preferably employed in the form of larger aggregates or agglomerated masses suc has pellets, tablets, coarse granules, or the like. In the latter case, the larger aggregates are advantageously formed previous to subjecting the clay to $H_2S$ treatment, but preferably immediately subsequent to the preliminary acid treatment, if practiced. These larger masses may be formed for instance by compressing the dry finely divided particles or powders in a pelleting machine or by previously wetting the dry, treated or untreated, clay with water or other inert liquid that will bind the small particles or powder into a cake which, after drying, can be broken up into granules or fragments of desired sizes or the wet mix can be formed into more regular shapes by molding including casting, extruding or the like. In instances where the described high temperature $H_2S$ treatment is carried out on powder or fine particles, the cohesive properties of the clay may be affected, in which case it may be necessary to add a suitable binder or lubricant to assist in the forming operation, care being taken in selecting such ingredient and maintaining the addition at a minimum so as not to interfere with the catalytic activity of the formed mass, as for in stance one can use a raw or acid activated clay of good cohesive properties as a binder for the treated clay. If the catalyst is to be employed in the hydrocarbon treating process in the form of fine particles or powders, the formation of larger aggregates such as granules, tablets or pellets for treatment with $H_2S$ is not necessary, but, if desired, such larger masses can be formed and treated in accordance with the above-described procedure and subsequently ground or comminuted to the required fineness.

Although the clay catalyst prepared by the preferred procedure has already been subjected to a high temperature treatment, it is still preferred as a final step in the preparation of the catalyst, for use in hydrocarbon conversion processes, to subject the same to calcination at temperature above 800° F. in air with or without added steam or in steam alone.

In accordance with the present invention the choice of raw clays for catalyst preparation is materially extended since it is made possible not only to obtain improved catalysts from hitherto employed active clays such as montmorillonites including acid-activated bentonites and the like, but by the herein disclosed novel processes clays such as those of the kaolin type which could not be brought to acceptable levels of catalytic activity by prior art methods, now become available for practical use as hydrocarbon conversion catalysts.

In the use of the catalysts of the present invention no change in conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 3, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalysts after use is regenerated by contacting it with air or other oxygen-containing gas to burn off carbonaceous deposits.

In the following examples notations of catalytic activity are expressed in terms of the standard test (CAT-A method) described in "Laboratory method for determining the activity of cracking catalysts" by J. Alexander and H. G. Shimp, page R537, National Petroleum News, August 2, 1944. In accordance with the method, a light gas oil is contacted with the catalyst under fixed cracking conditions and the activity of Since commercial acid activated montmorillonite clay is a successful catalyst in prominent commercial use in petroleum cracking, it was selected for comparison at various activity levels with the iron-freed catalyst of Example I. The tests were made under standard CAT-A method conditions on a light East Texas gas oil with the following results:

| Catalyst | Calcination | Yield | | | |
|---|---|---|---|---|---|
| | | Gasoline | Coke | Gas | Grav. |
| Commercial acid activated clay ($Fe_2O_3$=2.0%) | 1400° F.—10 hrs. 5% steam | 34.8 | 2.5 | 4.3 | 1.33 |
| | 1350° F.—4 hrs. 100% steam | 29.4 | 2.0 | 3.1 | 1.26 |
| Catalyst of Example I $Fe_2O_3$=0.1% | 1400° F.—10 hrs. 5% steam | 33.0 | 1.5 | 3.0 | 1.41 |
| | 1350° F.—4 hrs. 100% steam | 27.2 | 1.0 | 2.3 | 1.37 | the catalyst is designated in terms of volume per cent of obtained gasoline; the weight per cent of wet gas, specific gravity of the gas, and weight per cent of carbonaceous deposit are also determined.

Example I

Pellets of a commercial acid activated montmorillonite ("Filtrol") were treated with an excess of $H_2S$ at 1400° F. for two hours under air-free conditions, the apparatus and contents having been previously swept with nitrogen. The pellets turned black as a result of the treatment. An equal volume of 15% HCl was added to the treated pellets after cooling and let stand at room temperature for two hours with frequent shaking. The temperature rose initially with rapid $H_2S$ evolution and the color of the pellets noticeably faded. The acid mixture was then heated for 30 minutes on a steam bath, the temperature rising to 140° F. After decanting, fresh 15% HCl was added to the batch in equal volume and let stand for 22.5 hours, then drained and washed several times with distilled water on a filter until chloride free. The total acid employed was about 35% on clay weight. After drying in an oven at 200° F. the pellets were calcined in air at 1050° F. for two hours. The pellets were now whiter in color than the original pellets.

The X-ray diffraction patterns of the catalyst taken after calcination at temperature intervals from 1050° to 1650° F. indicate that the modified product prepared by the invention is generally less crystalline than the original acid activated clay, a comparison of the X-ray spectra of the two materials at several temperature levels in the designated range reveals variations in line patterns indicative of differences in atomic arrangement. The sample of the catalyst which had not received the gas treatment shows only progressive dimming of certain lines and other individual variations at 50° intervals in temperature, with an apparent transformation in crystalline structure between 1550° and 1600° F., and no amorphous condition over the range of temperatures studied. The gas-treated catalyst, on the other hand, approaches a form amorphous to the X-ray at 1550° F. and is completely so amorphous at 1600° F.; at 1650° F. there is the appearance of a new crystalline pattern indicative of a radical transformation in structure. Tested for cracking activity on a light gas oil there was produced 37.3% by volume of gasoline with 2.6% by weight of coke and 4.9% by weight of gas with the catalyst of the example.

The marked reduction in coke (40–50% lower) and gas produced by the new low iron catalyst with about the same gasoline yields is of even greater significance as indicative of the catalyst behavior in connection with high coke producing charge stocks, such as heavy petroleum oils. This was borne out in actual operation cracking a heavy East Texas crude oil fraction (27.6 API) wherein compared with typical commercial clay catalyst, the iron-freed catalyst yielded an increase in gasoline of over 10% of the gasoline recovery, with deposition of 10% less coke, and with about the same total liquid recovery.

Chemical analyses of the starting acid-activated montmorillonite clay and the modified low iron catalyst produced therefrom are shown below (calculated to an ignited basis):

| | Commercial acid-activated montmorillonite Parts by Wt. | Example I | |
|---|---|---|---|
| | | $SiO_2$ constant | Actual basis |
| $SiO_2$ | 73.9 | 73.9 | 76.7 |
| $Al_2O_3$ | 18.0 | 17.5 | 18.2 |
| $Fe_2O_3$ | 2.1 | .09 | 0.1 |
| CaO | 3.1 | .96 | 1.0 |
| MgO | 4.9 | 4.24 | 4.4 |

The characteristic temperature stability of catalysts of the present invention is significantly shown by the comparatively small change in pellet density and porosity after heat treatment at 1600° F. Whereas a typical commercial clay catalyst over the temperature range of 1500–1600° F. lost 50% of its porosity (measured in volume percent) the catalyst of Example I showed no significant shrinkage and less than 15% loss in porosity. Although with other active clays of the bentonite type losses in porosity of 50% or more may be encountered under these conditions, the modified clays of the invention showed a relatively small loss in porosity. The preferred modified clays of the montmorillonite class in accordance with the invention are those which lose less than 20% difference in porosity between such clays heated for two hours at 1500° F. and heated for the same period at 1600° F. The volume percent porosity in the following table was obtained by measuring the volume of water absorbed by a pellet of measured volume, substantially in accordance with the standard ASTM method (D468–42; method A—water absorption). The catalytic activity was well retained even after being subjected to the last stated high temperature, which temperature caused rapid decline in activity of a commercial catalyst from the same source clay. The results are shown by the following tabulation:

| | Heat Treating Catalyst Temperature, °F. | | | | | | | | Activity after 1600° F. | | |
|---|---|---|---|---|---|---|---|---|---|---|---|
| | 1400 | | 1500 | | 1550 | | 1600 | | Gasoline, Vol. percent | Coke, Wt. percent | Gas, Wt. percent |
| | p. d. | v. p. | p. d. | v. p. | p. d. | v. p. | p. d. | v. p. | | | |
| Commercial acid-activated clay catalyst | 1.08 | ------ | 1.12 | 53.6 | 1.4 | 35.8 | 1.59 | 26.8 | 11.2 | 0.4 | 1.2 |
| Catalyst of Example I | 1.01 | ------ | 1.02 | 58 | 1.05 | 55.0 | 1.14 | 50.0 | 35.3 | 1.4 | 4.1 | p. d.=pellet density; v. p.=volume percent porosity.

The characteristic resistance of the new catalysts to sulfur and sulfides at high temperature is demonstrated by a comparison of the same with typical clay catalyst of about the same initial activity level (39).

| | Activity after sulfidation | | | |
|---|---|---|---|---|
| | Gasoline, Vol. percent | Coke, Wt. percent | Gas, Wt. percent | Gas Grav. |
| (a) Commercial acid-activated clay (2.0% Fe₂O₃) | 22.2 | 8.0 | 8.9 | 0.58 |
| (b) Above clay after treatment (0.12% Fe₂O₃) | 38.7 | 2.5 | 7.9 | 1.55 |

The catalyst in (a) above was a typical commercial acid-activated clay while (b) was obtained by treating the same clay in accordance with Example I. The above sulfidation tests were made with H₂S at 1000° F. for 2 hours. The results are indicative of the respective stability of the two catalysts and their behaviour when employed for cracking or reforming of sulfur bearing charge stocks (compare Example IV).

Example II

The tendency towards improved gasoline/gas and gasoline/coke ratios is in many instances evident when the iron content of the clay has been reduced to the order of about .8% Fe₂O₃. For example, the commercial acid activated montmorillonite treated as in Example I except that the H₂S treatment was carried out at 1100° F. gave a catalyst which compared favorably with the original clay catalyst, as shown by the following tabulation:

| | Percent Fe₂O₃ | Vol. percent Gasoline | Wt. percent Coke | Wt. percent Gas | Grav. Gas |
|---|---|---|---|---|---|
| Original acid-activated clay catalyst | 2.0 | 39.9 | 3.4 | 5.9 | 1.40 |
| Example II | .77 | 39.9 | 2.7 | 5.2 | 1.49 |

Example III

A montmorillonite clay from Pontotoc, Mississippi (Fe₂O₃=5.38%) was treated with sulfuric acid of 15% strength at room temperature over a period of eight hours employing an amount of acid (100% basis) equal to 60% of the dried clay. After washing and drying the product was formed into pellets of about 4 mm. cross-section.

(a) One portion of the pellets was calcined for 2 hours in air at 1050° F. Analysis of the product gave 2.88% Fe₂O₃.

(b) Another portion of the pellets was treated with H₂S at 1400° F. for 2 hours. After cooling the pellets were leached with hydrochloric acid of 15% strength at room temperature for 24 hours, washed with water, dried and calcined in air at 1050° F. Analysis of the product gave 0.11% Fe₂O₃.

The activity of the catalysts produced in accordance with (a) and (b) above is compared in Example VIII.

Example IV

The following example illustrates the striking degree of stability of the iron-freed clay catalysts towards high sulfur stock. The catalyst of Example I was employed in cracking Santa Maria gas oil, a highly corrosive stock of high sulfur content, under the following operating conditions: charging 1.5 volume of oil per volume of catalyst per hour at a temperature of about 800° F. at atmospheric pressure, operating for 10 minutes with alternate regeneration. The following tabulation indicates the results obtained compared with commercial acid-activated clay catalyst used under the same conditions, the activity tests being on light East Texas gas oil.

| | Commercial clay catalyst (Fe₂O₃=2%) | | | Catalyst of Ex. I (Fe₂O₃=.1%) | | |
|---|---|---|---|---|---|---|
| | Gasoline | Coke | Gas | Gasoline | Coke | Gas |
| Activity test on Fresh Catalyst (CAT-A) | 34.8 | 2.5 | 4.3 | 33.0 | 1.5 | 3.0 |
| Santa Maria Gas Oil: | | | | | | |
| 1st run | 32 | 10.8 | 5.5 | 28 | 6.5 | 3.3 |
| 4th run | 27 | 11.7 | 7.0 | 30 | 6.5 | 2.9 |
| 8th run | 24 | 13.7 | 6.6 | 30 | 6.4 | 3.1 |
| CAT-A Activity Test after Santa Maria Gas Oil Cracking | 18.3 | 4.9 | 5.8 | 35.0 | 1.8 | 3.5 |

Example V

The raw clay treated in this example was a kaolin clay from Putnam County, Florida, known as "Edgar EPK" which gave the following analysis on a dry (105° C.), sand-free basis:

| | Percent |
|---|---|
| Ignition Loss | 12.9 |
| SiO₂ | ¹46.6 |
| Al₂O₃ | ¹38.8 |
| Fe₂O₃ | 1.0 |
| CaO | 0.44 |
| MgO | 0.23 |
| TiO₂ | 0.35 |
| Alk. metal (as oxide) | 0.52 |

¹ SiO₂/Al₂O₃=1.2.

The above clay was subjected in raw state to treatment with H₂S in excess at 1500° F. for two hours. The clay became intensely black. After cooling, it was leached with an equal volume of 15% HCl over a period of 72 hours, the acid being changed 4 times. After decanting, washing and drying, the clay was calcined at 1050° F. for two hours in air. The analyzed iron content was .07% Fe₂O₃. The activity of the obtained catalyst is compared in the following table with the original raw clay and the same clay which received only an acid-treatment with 10% H₂SO₄ (.40 ratio to dry clay) for eight hours and calcined under same conditions as the compared products.

| Edgar Clay | Gasoline | Coke | Gas | Gas Grav. |
|---|---|---|---|---|
| Raw | 14.5 | 2.7 | 4.0 | 0.57 |
| Acid treated | 27.8 | 1.8 | 4.4 | 1.36 |
| H₂S treated & acid leached | 40.8 | 3.1 | 10.2 | 1.46 |

Example VI

Other typical examples of increase in gasoline yields as well as lowered coke after removal of iron by the described methods are illustrated by the following comparisons:

| | Gasoline | Coke | Gas |
|---|---|---|---|
| Commercial acid activated Milwhite clay (a Texas montmorillonite) Fe₂O₃ =.5.1 | 42.4 | 6.4 | 12.1 |
| Above clay modified Fe₂O₃=.15% | 44.0 | 4.5 | 9.7 |
| Bentonite clay from Pontotoc, Miss., activated with H₂SO₄ (Example IIIa) Fe₂O₃=2.88% | 34.1 | 4.1 | 7.3 |
| Above clay modified (Example IIIb) Fe₂O₃=.11% | 41.4 | 3.4 | 8.9 |
| Raw kaolin clay from Huron, Indiana, Fe₂O₃=.95% | 13.2 | 7.4 | 6.8 |
| Above clay modified Fe₂O₃=.11% | 39.5 | 3.4 | 10.3 |

Obviously many modifications and variations of the invention as hereinbefore set forth may be made without departing from the spirit and scope thereof and therefore only such limitations should be imposed as are indicated in the appended claims.

Treatment of clays with hydrogen sulfide is also described among other reagents therein named in our copending applications Serial Nos. 644,421 and 644,422 filed simultaneously with the present application. Hydrocarbon conversion processes employing catalytic contact masses that may be prepared in accordance with the present invention are particularly claimed in our copending applications Serial Nos. 644,425 and 644,426, also simultaneously filed.

We claim as our invention:

1. The method of preparing adsorptive contact masses, which comprises subjecting iron-containing clay to contact with hydrogen sulfide at a temperature in excess of 1200° F. and insufficient to effect substantial incipient fusion of the clay, and removing the formed iron sulfide.

2. The method of preparing adsorptive contact masses, which comprises subjecting a pelleted kaolin clay containing iron compounds to contact with hydrogen sulfide at a temperature in excess of 1200° F. and insufficient to effect substantial incipient fusion of the clay, and removing the formed iron sulfide.

3. The method of preparing adsorptive contact masses of improved stability which comprises subjecting an iron-containing montmorillonite clay to contact with hydrogen sulfide at a temperature in excess of 1200° F. and insufficient to effect substantial incipient fusion of the clay, and removing the formed iron sulfide.

4. The method of preparing adsorptive contact masses of improved stability, which comprises subjecting an acid-activated sub-bentonite clay to contact with hydrogen sulfide at elevated temperature of at least 1100° F. to convert residual iron compound present therein to iron sulfide and removing the formed iron sulfide, said elevated temperature being maintained below that causing rapid shrinkage of the clay.

5. The method of preparing catalysts from montmorillonite clay which comprises subjecting the clay in subdivided form to acid treatment sufficient to increase the porosity of the clay, forming the acid treated clay into pieces, subjecting said pieces to contact with hydrogen sulfide at a temperature in excess of 1200° F. and insufficient to effect substantial incipient fusion of the clay, and leaching the sulfided clay with dilute mineral acid.

6. The method of preparing catalytic contact masses of improved properties which comprises treating a montmorillonite clay with vapors of hydrogen sulfide at a temperature of 1200–1500° F., and leaching the sulfided clay with dilute acid at room temperature.

7. The method of preparing catalytic contact masses of improved properties which comprises treating a kaolin clay with vapors of hydrogen sulfide at a temperature of 1200–1600° F., and leaching the sulfided clay with dilute acid.

8. The method of preparing from acid-activatable montmorillonite clays catalysts of improved stability, which comprises subjecting such a clay in raw condition and in finely divided form to treatment with mineral acid at least sufficient to increase the porosity of the clay but insufficient to reduce the alumina content of the clay to below a silica-alumina ratio of 10:1, forming the acid treated clay into pellets, subjecting the pellets to contact with hydrogen sulfide gas at a temperature of at least 1200° F. to release residual iron compounds not previously removed by the acid treatment and to convert such compounds to iron sulfide, said temperature being below that causing substantial incipient fusion of the clay, leaching the thus sulfided pellets with aqueous acid under mild conditions such that no material disintegration of the pellets takes place, said acid leaching being continued for a time sufficient to remove the iron sulfide formed to an extent such that the final iron content of the pellets corresponds to no more than 0.4% Fe₂O₃ on a dry clay basis, whereby the thus obtained clay pellets are catalytically active and stable against rapid shrinkage at temperatures of 1600° F. as well as stable to sulfur and sulfide containing gases at 1000° F.

9. The method of preparing active catalytic contact masses of improved stability from acid-activated montmorillonite clays, which comprises subjecting such a clay in acid-activated condition to treatment with hydrogen sulfide at a temperature of at least 1100° F. but insufficient to cause substantial incipient fusion of the clay and for time sufficient to release residual iron tenaciously held in the clay by converting such residual iron to iron sulfide, leaching the thus sulfided clay with dilute aqueous acid under conditions and for a time sufficient to remove the formed iron sulfide and leave present in the clay a content of iron compounds corresponding to less than 0.4% Fe₂O₃ by weight of dry clay, while maintaining substantially constant the original silica-alumina ratio of the starting acid activated clay, and thereafter drying the thus treated clay, whereby the obtained dried clay becomes stable against material shrinkage and rapid decline in catalytic activity at 1600° F., and is stable to sulfur and sulfide containing gases at 1000° F.

10. The method of activating kaolin which comprises treating the same with hydrogen sulfide at a temperature not less than 1200° F. and below 1650° F., acid leaching the sulfided product, and calcining the residue.

11. The method of preparing contact masses of improved stability to sulfur bearing and sulfide containing gases at elevated temperature from acid activatable sub-bentonite clays, which comprises subjecting such a clay to treatment with mineral acid under conditions and to an extent sufficient to effect activation thereof, thereby removing portions of the aluminum and iron content of said clay, treating the thus activated clay at a temperature in the order of 1200–1500° F. with hydrogen sulfide thereby transforming unremoved iron present therein to iron sulfide, and removing the iron sulfide so formed.

12. The method of preparing clay catalysts of low iron content which comprises the steps of acid treating a montmorillonite clay to an extent at least sufficient to improve the porosity thereof and insufficient to reduce the alumina content below 10% of the clay, washing the acid-treated product, subjecting the washed product to treatment with hydrogen sulfide at a temperature of at least 1200° F. but below temperatures causing rapid shrinkage of the clay, thereby transforming any residual iron present to iron sulfides, and removing the iron sulfides thus formed.

13. The method of preparing clay catalysts of low iron content which comprises the steps of acid treating clay to an extent at least sufficient to improve the porosity thereof and insufficient to reduce the alumina content below 10% of the clay, washing the acid-treated product, subjecting the washed product to treatment with hydrogen sulfide at about 1400° F. thereby transforming any residual iron present to iron sulfides, and removing the iron sulfides so formed.

HUBERT A. SHABAKER.
GEORGE ALEXANDER MILLS.
RUTH C. DENISON.

REFERENCES CITED

The following references are of record in the file of this patent:

UNITED STATES PATENTS

| Number | Name | Date |
|---|---|---|
| 1,727,441 | Parentani | Sept. 10, 1929 |
| 2,391,312 | Ewing et al. | Dec. 18, 1945 |
| 2,388,302 | Weyl | Nov. 6, 1945 |